(12) United States Patent
Takahashi

(10) Patent No.: US 11,923,519 B2
(45) Date of Patent: Mar. 5, 2024

(54) BATTERY PACK

(71) Applicant: Hitachi Automotive Systems, Ltd., Hitachinaka (JP)

(72) Inventor: Hirofumi Takahashi, Tokyo (JP)

(73) Assignee: Vehicle Energy Japan Inc., Hitachinaka (JP)

(*) Notice: Subject to any disclaimer, the term of this patent is extended or adjusted under 35 U.S.C. 154(b) by 357 days.

(21) Appl. No.: 16/334,230

(22) PCT Filed: Jan. 31, 2018

(86) PCT No.: PCT/JP2018/003100
§ 371 (c)(1),
(2) Date: Mar. 18, 2019

(87) PCT Pub. No.: WO2018/179800
PCT Pub. Date: Oct. 4, 2018

(65) Prior Publication Data
US 2019/0386268 A1 Dec. 19, 2019

(30) Foreign Application Priority Data
Mar. 30, 2017 (JP) ................. 2017-066636

(51) Int. Cl.
H01M 10/613 (2014.01)
H01M 10/625 (2014.01)
(Continued)

(52) U.S. Cl.
CPC ....... *H01M 10/613* (2015.04); *H01M 10/625* (2015.04); *H01M 10/647* (2015.04);
(Continued)

(58) Field of Classification Search
CPC ............. H01M 10/625; H01M 10/647; H01M 10/6554; H01M 10/613; H01M 10/0481;
(Continued)

(56) References Cited

U.S. PATENT DOCUMENTS

2013/0316214 A1  11/2013  Nagashima
2015/0118537 A1*  4/2015  Obasih ................ H01M 50/124
                                                                429/120
(Continued)

FOREIGN PATENT DOCUMENTS

EP    2 797 137 A2   10/2014
JP    2012-94312 A    5/2012
(Continued)

OTHER PUBLICATIONS

Japanese-language Office Action issued in Japanese Application No. 2017-066636 dated Aug. 18, 2020 with English translation (six (6) pages).
(Continued)

Primary Examiner — Stephen J Yanchuk
(74) Attorney, Agent, or Firm — Crowell & Moring LLP

(57) ABSTRACT

A temperature rising between unit cells in a cell group is suppressed. A battery pack disclosed in the invention includes a case, a cell group which connects a plurality of unit cells and is disposed to abut on a bottom surface of the case, and a fixing member which fixes the cell group. The fixing member includes a heat path that links from the upper surface of a battery to the side surface of the case.

16 Claims, 8 Drawing Sheets

(51) Int. Cl.
  *H01M 10/647* (2014.01)
  *H01M 10/6554* (2014.01)
  *H01M 50/209* (2021.01)
  *H01M 50/224* (2021.01)
(52) U.S. Cl.
  CPC ..... *H01M 10/6554* (2015.04); *H01M 50/209* (2021.01); *H01M 50/224* (2021.01)
(58) Field of Classification Search
  CPC .. H01M 10/658; H01M 2/1077; H01M 50/20; Y02E 60/10; Y02P 70/50
  See application file for complete search history.

(56) References Cited

U.S. PATENT DOCUMENTS

| | | | | |
|---|---|---|---|---|
| 2015/0263397 | A1* | 9/2015 | Janarthanam | H01M 10/6554 429/120 |
| 2015/0311485 | A1 | 10/2015 | Fister et al. | |
| 2017/0047624 | A1* | 2/2017 | Gunna | H01M 10/6556 |
| 2017/0125865 | A1* | 5/2017 | Mascianica | B60L 58/26 |
| 2017/0222283 | A1* | 8/2017 | Choi | H01M 10/6569 |
| 2017/0331079 | A1* | 11/2017 | Yu | H01M 2/0237 |
| 2018/0108892 | A1* | 4/2018 | Kim | H01M 2/1252 |
| 2018/0138560 | A1* | 5/2018 | Bessho | H01M 50/463 |
| 2018/0154754 | A1* | 6/2018 | Rowley | H01M 50/20 |

FOREIGN PATENT DOCUMENTS

| | | |
|---|---|---|
| JP | 2012-169213 A | 9/2012 |
| JP | 2014-170687 A | 9/2014 |
| JP | 2015-26486 A | 2/2015 |
| WO | WO 2012/133708 A1 | 10/2012 |

OTHER PUBLICATIONS

International Search Report (PCT/ISA/210) issued in PCT Application No. PCT/JP2018/003100 dated Mar. 30, 2018 with English translation (four (4) pages).

Japanese-language Written Opinion (PCT/ISA/237) issued in PCT Application No. PCT/JP2018/003100 dated Mar. 30, 2018 (three (3) pages).

Extended European Search Report issued in European Application No. 18778204.0 dated Dec. 22, 2020 (seven (7) pages).

* cited by examiner

| | TEMPERATURE RISING (°C) | DIFFERENCE IN TEMPERATURE RISING TO FIRST COMPARATIVE EXAMPLE (°C) |
|---|---|---|
| FIRST EXAMPLE | 39.7 | 8.4 |
| FIRST COMPARATIVE EXAMPLE | 48.1 | — |
| SECOND COMPARATIVE EXAMPLE | 47.5 | 0.6 |

BATTERY PACK

TECHNICAL FIELD

The present invention relates to a battery pack.

BACKGROUND ART

In recent years, demands for secondary batteries for vehicles are on the rise as an environmental regulation becomes tightened. Among them, a lithium-ion secondary battery generally has a high voltage compared to a lead battery and a nickel-hydrogen battery. Therefore, the lithium-ion secondary battery is promising because of a small size and a high energy density. For example, a higher energy density, a high power density, and a long life span are required for the lithium-ion secondary battery for a full-scale application. In order to increase the output power of the battery, for example, it is effective that a large amount of current is input and output with respect to the battery together with a high voltage. However, in a case where a large amount of current is input to and output from the battery, the current causes the battery to be heated due to an internal resistance of the battery. In a case where the generated heat is not able to be sufficiently removed from the battery, the battery temperature rises. The battery characteristics such as a battery capacity and an internal resistance of the lithium-ion battery show different degradation behaviors depending on the battery temperature. In particular, the degradation may proceed as high as the battery temperature rises. Therefore, there is a need to develop a technology to improve a heat dissipation performance of the battery and to reduce the battery temperature.

With this regard, there is known a technology in which the temperature rising of the unit cell is suppressed in a cell group formed by a plurality of unit cells. In PTL 1, a plurality of batteries are arranged back and forth on a heat transfer surface of a cooling plate while inserting an insulating separator therebetween. Holding plates are placed back and forth, and right and left of these battery arrays. The holding plates are connected to hold each battery. There are horizontally arranged battery storage units which are independent from each other such that the separators integrally hold the plurality of batteries in parallel. According to this configuration, the cooling performance of the battery degrades.

CITATION LIST

Patent Literature

PTL 1: JP 2012-94312 A

SUMMARY OF INVENTION

Technical Problem

In the technique disclosed in PTL 1, a battery pack is obtained which does not degrade in the cooling performance due to a gap generated depending on the layout of the unit cells in the cell group. However, the cooling of the cell group is not possible only by the heat dissipation performance in the cell group. Therefore, it is important to secure a heat dissipation path to the outside of the battery pack. The invention has been made in view of the problem, and an object thereof is to improve an effect of dissipating the heat generated from the unit cell outside the battery pack through the case of the battery pack.

Solution to Problem

A battery pack includes a case, a cell group which connects a plurality of unit cells and is disposed to abut on a bottom surface of the case, and a fixing member which fixes the cell group. The fixing member includes a heat path that links from an upper surface of a battery to a side surface of the case.

Advantageous Effects of Invention

According to the invention, the heat generated from a unit cell can be efficiently dissipated to the outside, so that it is possible to suppress a temperature rising between unit cells in a cell group.

DESCRIPTION OF EMBODIMENTS

Embodiments of the invention will be described. However, the embodiments are not limited to the content below, may be arbitrarily changed within a scope not departing from the spirit of the invention.

Figure 1:
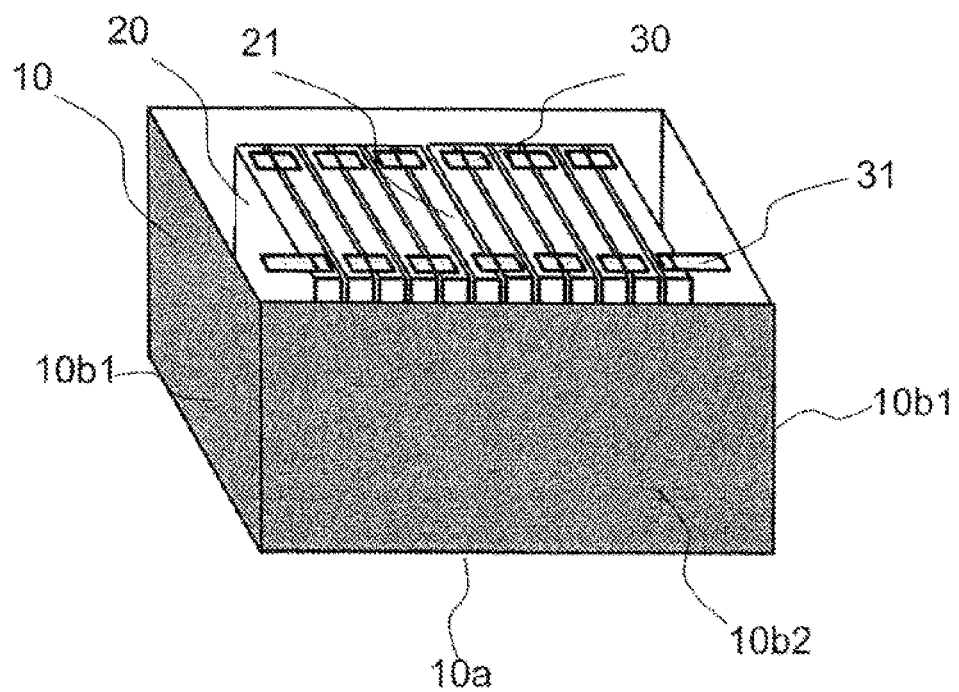
FIG. 1 is a perspective view of a battery pack.

FIG. 1 is a diagram illustrating a battery pack 100 which consists of a case 10, a cell group 21 which is formed of assembled unit cells 20, and a terminal 30 which is electrically connected between the unit cells, and an external terminal 31 which electrically connects the cell group and the outside of the case. Besides, a control board (not illustrated), a measurement mechanism of a voltage, a current, and a temperature, a machining mechanism of the unit cell 20 may be stored in the case.

The cell group 21 abuts on a bottom surface 10a of the case 10. At least a part of the side surface of the cell group 21 does not abut on the case 10. FIG. 1 is a diagram illustrating a case where four side surfaces do not abut on the side surfaces (10b1 and 10b2) of the case 10 in the cuboid cell group 21.

Figure 2:
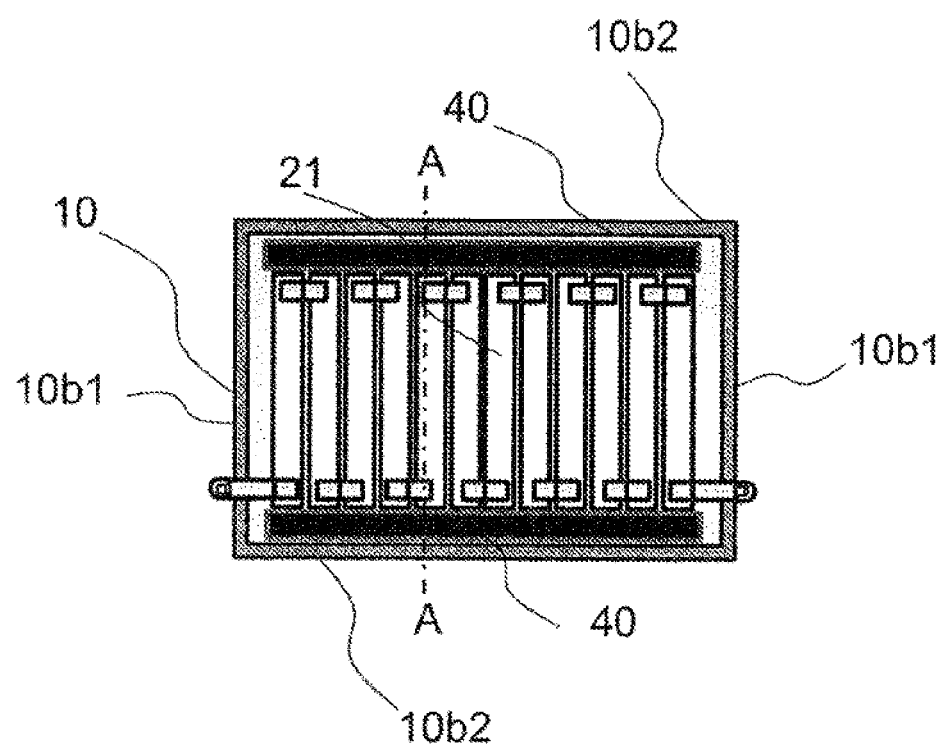
FIG. 2 is a top view of the battery pack.

FIG. 2 is a top view of the battery pack illustrated in FIG. 1. A fixing member 40 is provided in two surfaces of the long side portion of the cell group 21. Further, the fixing member 40 may be provided in any surface where the cell group and the case 10 do not abut on. The feature of the invention relates to the shape of the fixing member 40. Hereinafter, the shape of the fixing member 40 in the embodiments will be described.

FIGS. 3 to 8 illustrate a cross section taken along line A-A of FIG. 2 in a case where various fixing members 40 are used.

First Embodiment

Figure 3:
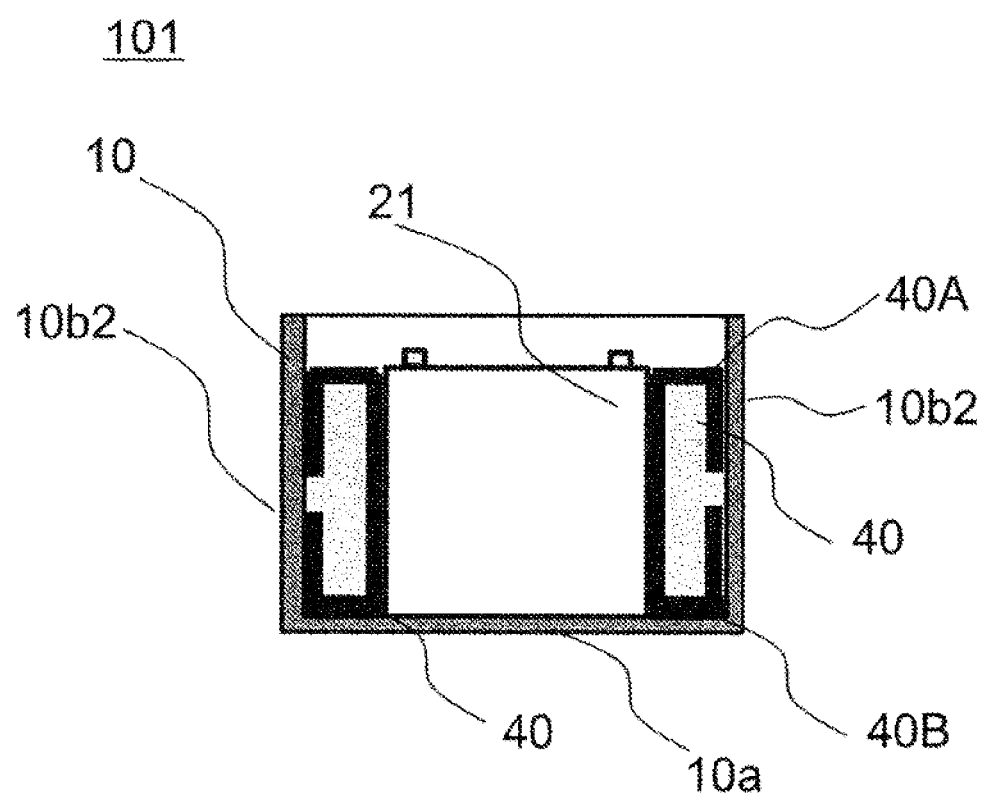
FIG. 3 is a cross-sectional view of a first embodiment.

FIG. 3 is a cross-sectional view of a battery pack 101 of a first embodiment in which the shape of the fixing member 40 is made in a C shape. In this embodiment, the shape of the fixing member 40 is formed to have two paths, an upper path 40A and a lower path 40B up to the case side surface 10b2. A direct heat transfer path is provided to extend from the upper portion of the cell group and the lower portion of the cell group to the case side surface 10b2 with respect to the cell group 21. Therefore, the configuration is made easy and light in comparison with the other embodiments. The configuration can be manufactured easily by bending the fixing member.

Second Embodiment

Figure 4:
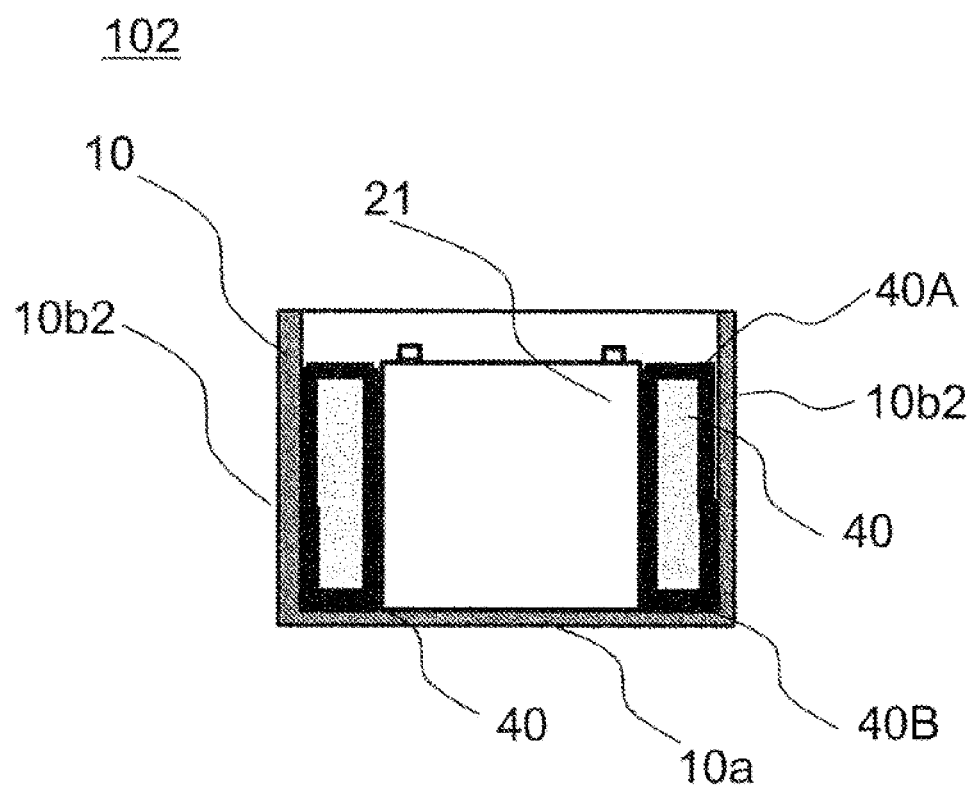
FIG. 4 is a cross-sectional view of a second embodiment.

FIG. 4 is a cross-sectional view of a battery pack 102 of a second embodiment in which the shape of the fixing member 40 is an O shape. In the second embodiment, the shape of the fixing member 40 is formed in consideration of the first embodiment to have two paths (the upper path 40A and the lower path 40B) up to the case side surface 10b2, and is configured such that the portion abutting on the case side surface 10b2 of the fixing member 40 is extended.

Therefore, in this embodiment, the heat transfer path from the cell group 21 to the case side surface 10b2 is equal to the first embodiment. However, a contact area between the fixing member and the case side surface is increased, and the heat dissipation performance is improved.

Third Embodiment

Figure 5:
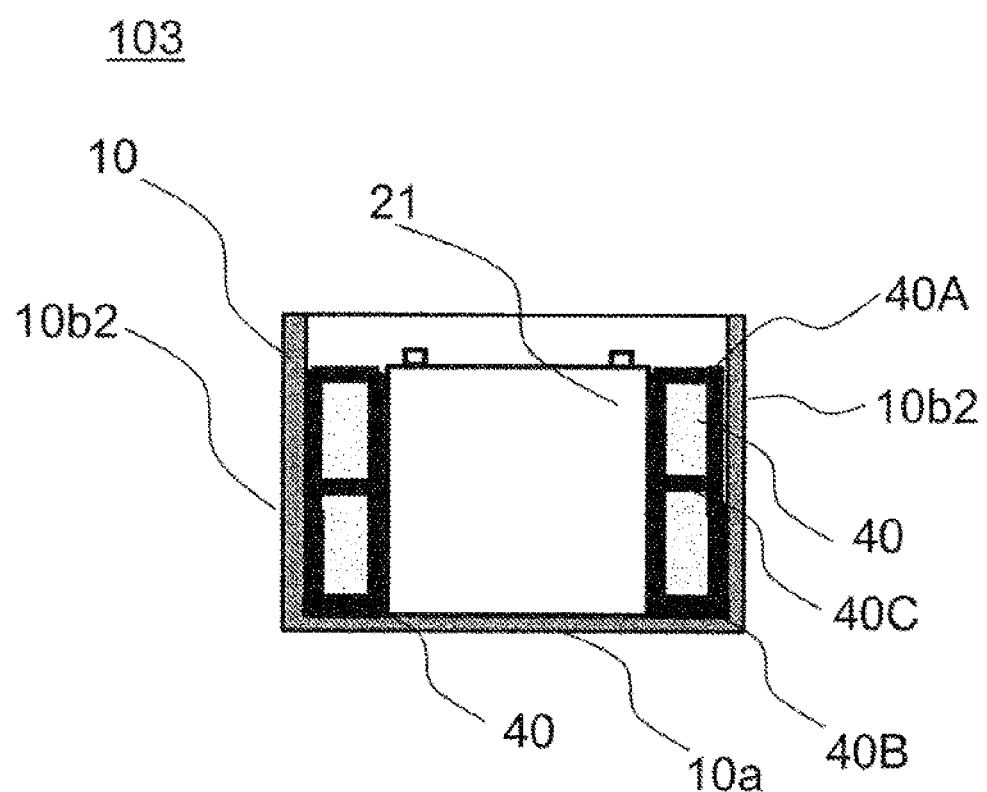
FIG. 5 is a cross-sectional view of a third embodiment.

FIG. 5 is a cross-sectional view of a battery pack 103 of a third embodiment in which the shape of the fixing member 40 is formed in an O shape, and an intermediate heat dissipation path 40C is further provided inside. In the third embodiment, the shape of the fixing member 40 is formed in consideration of the second embodiment to have two paths (the upper path 40A and the lower path 40B) up to the case side surface 10b2, and is configured such that the portion abutting on the case side surface 10b2 of the fixing member 40 is extended and the heat transfer path up to the case side surface 10b2 is increased.

Therefore, the contact area between the fixing member and the case side surface is equal to the second embodiment. However, the heat transfer path from the cell group 21 to the case side surface 10b2 is increased, so that the heat dissipation is improved.

Fourth Embodiment

Figure 6:
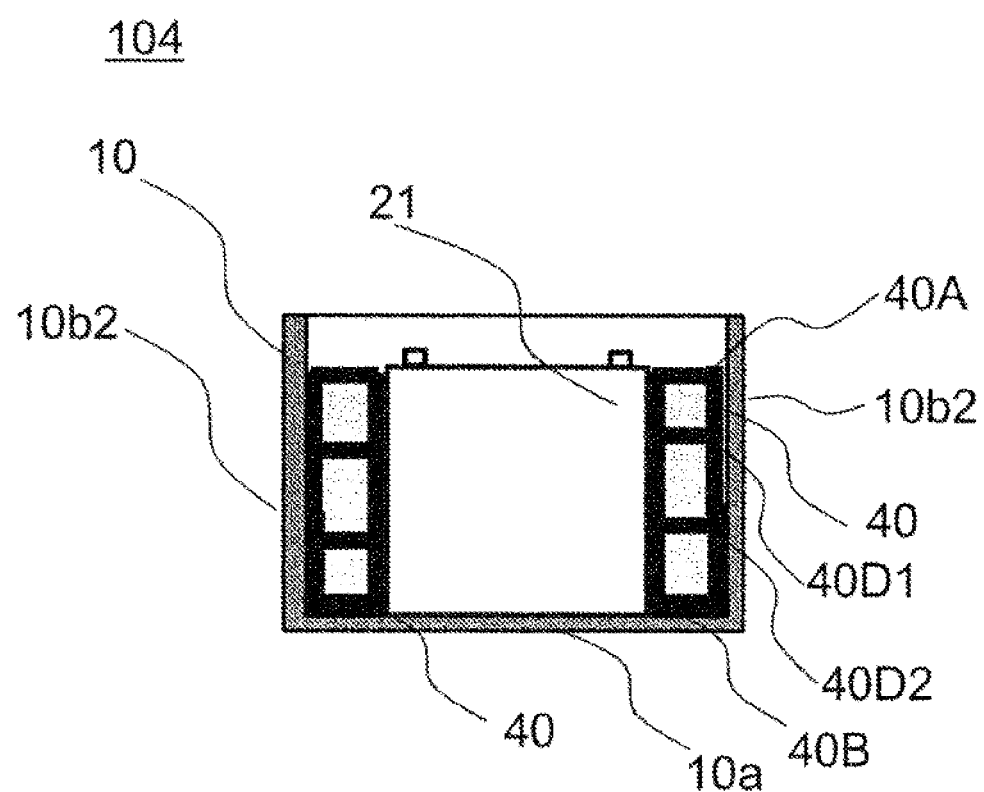
FIG. 6 is a cross-sectional view of a fourth embodiment.

FIG. 6 is a cross-sectional view of a battery pack 104 of a fourth embodiment in which the shape of the fixing member 40 is formed in an O shape, and a plurality of intermediate heat dissipation paths 40D (40D1 and 40D2) are further provided inside. In the fourth embodiment, the plurality of heat transfer paths from the cell group 21 to the case side surface 10b2 are added (heat transfer paths 40D1 and 40D2 are added) in the fixing member 40 of the third embodiment. The contact area between the fixing member and the case side surface is equal to the third embodiment. However, the heat transfer path from the cell group 21 to the case side surface 10b2 is further increased, so that the heat dissipation performance is improved.

First Comparative Example

Figure 7:
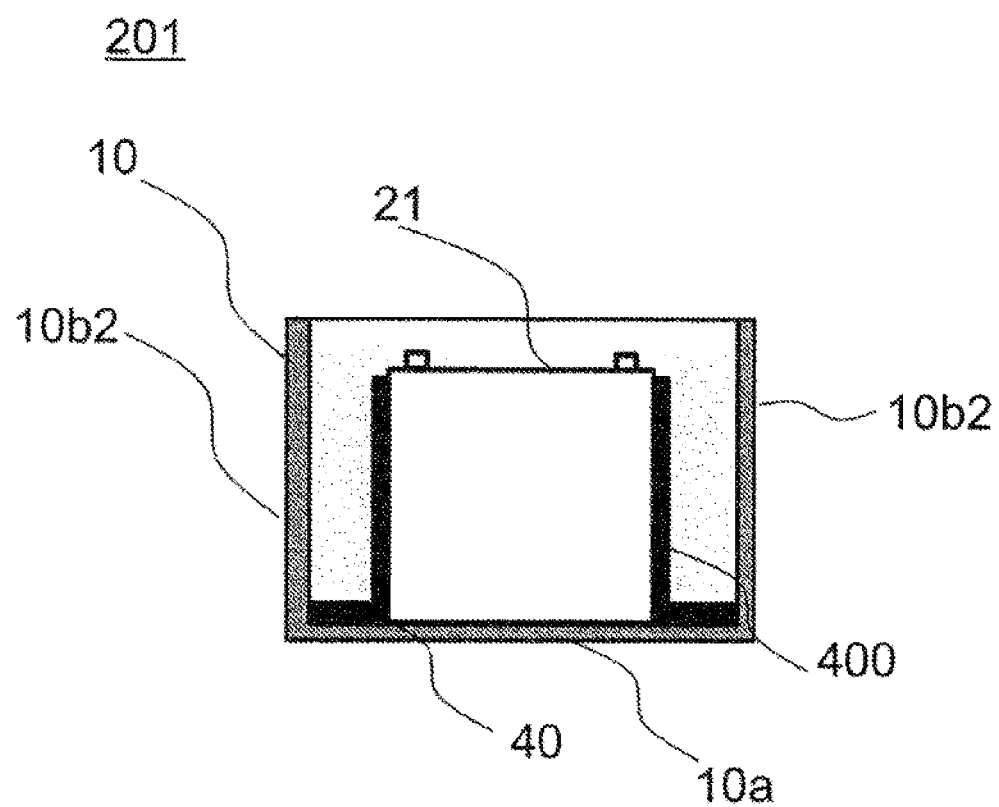
FIG. 7 is a cross-sectional view of a first comparative example.

FIG. 7 is a cross-sectional view of a battery pack 201 of a first comparative example. The fixing member attached to the side surface of the cell group 21 is fixed to the bottom surface 10a of the case so as to fix the cell group 21 in the case, and the fixing member 401 is structured not to have two paths (the upper path and the lower path) up to the case side surface 10b2.

Second Comparative Example

Figures 8, 9:
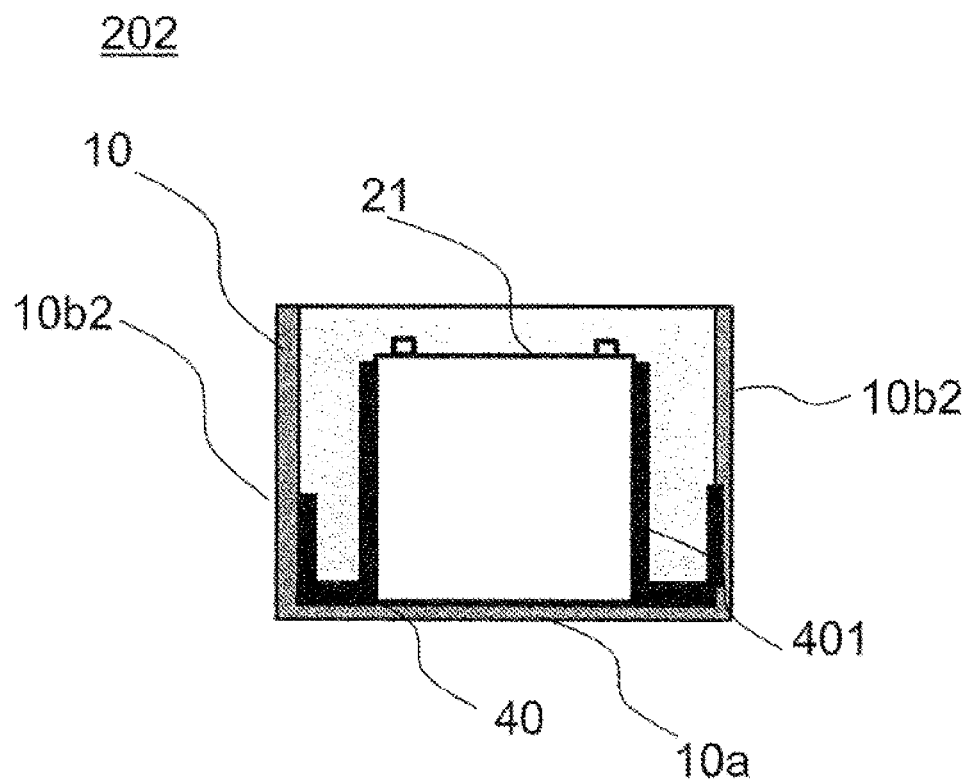
FIG. 8 is a cross-sectional view of a second comparative example.
FIG. 9 is a temperature simulation result.

FIG. 8 is a cross-sectional view of a battery pack 202 of a second comparative example. In the cell group 21, the fixing member 402 is provided with the direct heat transfer path from the lower portion of the cell group 21 to the case side surface 10b2. The fixing member 402 is formed not to have the upper path up to the case side surface 10b2.

Hereinbelow, the effects of the invention will be described on the basis of the results of the embodiments and the comparative examples.

As a result of simulations of heating of the cell group 21 with the configuration illustrated in the embodiments and the comparative examples, the temperature of the cell group 21 rises and reaches a normal state. FIG. 9 is a diagram illustrating a difference between a highest temperature and an ambient temperature in the cell group of the first embodiment, the first comparative example, and the second comparative example.

In the first comparative example, the heat generated in the cell group 21 moves to the bottom surface 10a of the case once, and transferred to the case side surface 10b. In the second comparative example, the direct heat transfer path that transfers the heat generated in the cell group from the lower portion of the cell group to the case side surface 10b2 is provided in the first comparative example, and the same result as the first comparative example is obtained regardless of the increase of the heat transfer path.

In the first embodiment, the direct heat transfer path from the upper portion of the cell group 21 to the case side surface is added to the second comparative example. The increased portion of the heat transfer path is similar to the second comparative example with respect to the first comparative example. However, with the addition of the heat transfer path to the upper portion of the cell group 21, the effect of temperature rising suppression is about 14 times greater.

The effect of temperature rising suppression of the first embodiment is obtained from the cross section even more than in the second to fourth embodiments, and the description is omitted.

In the cell group 21, in a case where the unit cells 20 are connected to each other, and abut on the bottom surface 10a of the case, the bottom surface 10a of the case becomes the main heat transfer path. Therefore, in a case where the heat transfer path from the upper portion of the cell group 21 to the case side surface 10b2 is added, the similar effect is obtained even if the shape of the unit cell has a cylindrical shape, a rectangular shape, or a pouch shape. On the other hand, in consideration of the heat dissipation performance of the inside of the cell group 21, the contact area between the unit cells is desirably secured to stack the rectangular batteries of the cuboid shape or the pouch batteries.

The fixing member 40 may be configured by any material such as metal or resin as long as the heat transfer performance and the strength for fixing the cell group 21 are secured. It is preferred that a metal portion having a high heat transfer performance and the strength is provided. In a case where metal is used, and there is a need to secure insulation in the unit cell, an insulating material is desirably interposed between the unit cell 20 and the fixing member 40 or between the fixing member 40 and the case. Further, the insulating material is more desirable to be interposed between the unit cell 20 and the fixing member 40 near the unit cell 20.

The material of the case 10 may be configured by any material such as metal or resin as long as the heat transfer performance and the strength for fixing the cell group 21 are secured. It is preferred that a metal portion having a high heat transfer performance and the strength is provided.

Further, this specification has been described about a case where the battery is erected such that the terminal of the unit cell is disposed in the upper portion. The cell group may be configured in a state where the battery is horizontally disposed such that the terminal of the unit cell is located in the side surface, and the battery pack may be configured such that the cell group abuts on the bottom surface of the case. The effect of the heat transfer path from the upper portion of the cell group away from the bottom surface of the case to the case side surface is obtained similarly.

Hitherto, the embodiments of the invention have been described, but the invention is not limited to the embodiments. Various modifications may be made within a scope not departing from the spirit of the invention disclosed in claims. For example, the above-described embodiments of the invention have been described in detail in a clearly understandable way, and are not necessarily limited to those having all the described configurations. In addition, some of the configurations of a certain embodiment may be replaced with the configurations of the other embodiments, and the configurations of the other embodiments may be added to the configurations of the subject embodiment. In addition, some of the configurations of each embodiment may be omitted, replaced with other configurations, and added to other configurations.

REFERENCE SIGNS LIST

10 case
20 unit cell
21 cell group
30 terminal
31 external terminal
40 fixing member

The invention claimed is:

1. A battery pack comprising:
a battery group comprising:
  a battery group side surface;
a case storing the battery group, the case comprising;
  a case bottom surface;
  a case side surface spaced by a gap from the battery group side surface;
a fixing member having a C-shaped cross section perpendicular to the case side surface and disposed in the gap between the case side surface and the battery group side surface, wherein
  the fixing member fixes the battery group to the case,
  the fixing member transfers heat from the battery group to the case,
  the cross section of the fixing member comprises:
    a first portion that thermally contacts the battery group side surface and forms a first side of an enclosed space;
    a second portion that thermally contacts the case side surface and comprises an opening; and
    a third portion that thermally connects the first portion and the second portion and forms a second and third side of the enclosed space, the third portion comprising:
      a lower path disposed on the case bottom surface; and
      an upper path disposed opposite the bottom surface, wherein
      the first, second, and third portions, in conjunction with the case side surface via the opening, form the enclosed space within the gap.

2. The battery pack according to claim 1, wherein a unit cell of a plurality of unit cells are formed in a rectangular shape or a pouch shape, and large side surfaces of the unit cells are stacked to face each other to form the battery group.

3. The battery pack according to claim 1, wherein the fixing member contains metal.

4. The battery pack according to claim 1, wherein the case is made of metal.

5. The battery pack according to claim 1, wherein an insulating material is disposed between a unit cell of the battery group and the fixing member.

6. The battery pack according to claim 2, wherein the fixing member contains metal.

7. The battery pack according to claim 2, wherein the case is made of metal.

8. The battery pack according to claim 3, wherein the case is made of metal.

9. The battery pack according to claim 2, wherein an insulating material is disposed between a unit cell of the battery group and the fixing member.

10. The battery pack according to claim 3, wherein an insulating material is disposed between a unit cell of the battery group and the fixing member.

11. The battery pack according to claim 4, wherein an insulating material is disposed in the battery group and/or between a unit cell of the battery group and the fixing member.

12. The battery pack according to claim 1, wherein the lower path of the third portion of the cross section of the fixing member includes a heat path that links from a lower surface of the battery group to the side surface of the case.

13. The battery pack according to claim 1, wherein the first portion of the cross section of the fixing member is provided on a side surface of the battery group that does not abut the case.

14. The battery pack according to claim 12, wherein the case side surface spans from an upper surface of the battery to the lower surface of the battery.

15. A battery pack comprising:
a battery group comprising:
  a battery group side surface;
a case storing the battery group, the case comprising;
  a case bottom surface;
  a case side surface parallel to the battery group side surface and spaced by a gap from the battery group side surface; and
a fixing member having a C-shaped cross section perpendicular to the case side surface and disposed in the gap between the case side surface and the battery group side surface, wherein
  the fixing member is configured to transfer heat from the battery group to the case,
  the cross section of the fixing member comprises:
    a first portion that thermally contacts the battery group side surface and forms a first side of an enclosed space;

a second portion that thermally contacts the case side surface along a length of the case side surface and comprises an opening; and a third portion that thermally connects the first portion and the second portion and forms a second and third side of the enclosed space, wherein the case side surface forms a fourth side of the enclosed space via the opening.

16. A battery pack comprising:
a battery group comprising:
  a battery group side surface;
a case storing the battery group, the case comprising;
  a case bottom surface;
  a case side surface spaced by a gap from the battery group side surface; and
a fixing member having a C-shaped cross section forming an enclosed space that is enclosed in-part by directly abutting the case side surface, wherein
  the fixing member is arranged perpendicular to the case side surface,
  the fixing member is disposed in the gap between the case side surface and the battery group side surface,
  the fixing member is configured to transfer heat from the battery group to the case, and
  the cross section of the fixing member comprises:
    a portion that thermally contacts the case side surface and comprises and opening.

* * * * *